UNITED STATES PATENT OFFICE.

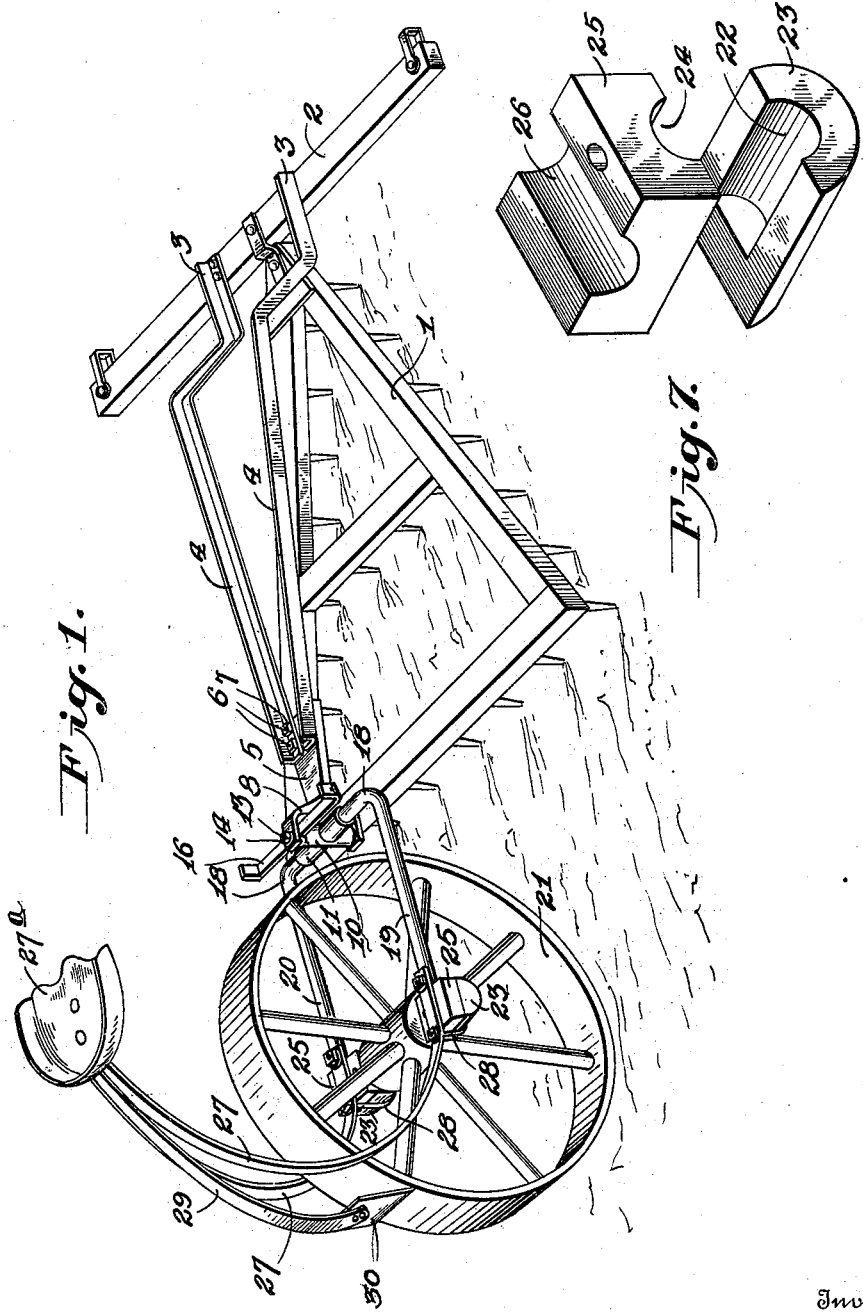

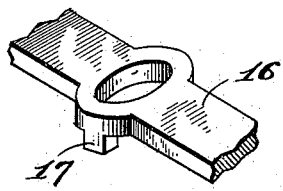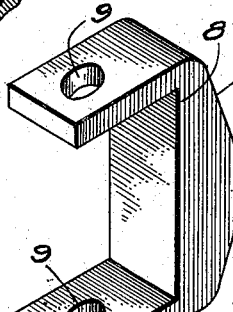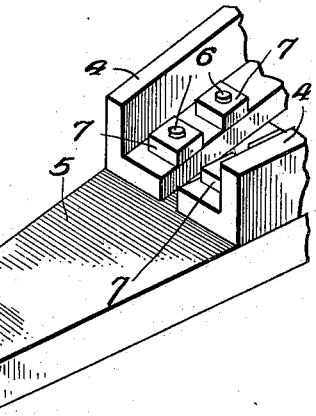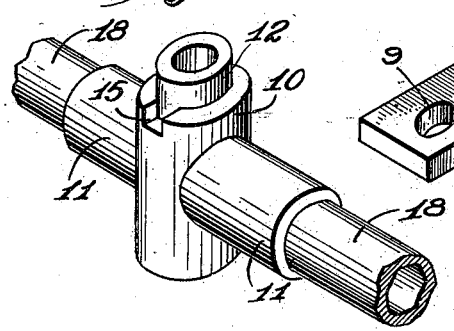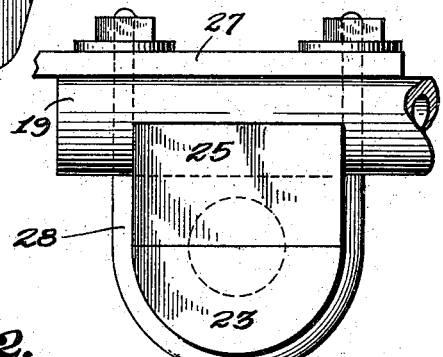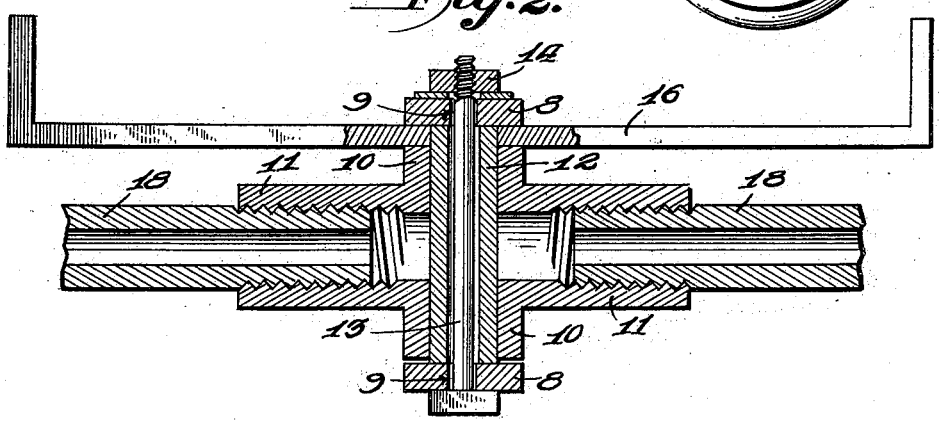

RICHARD R. CYRUS, OF COVELLO, WASHINGTON.

RIDING ATTACHMENT FOR HARROWS.

981,982.  Specification of Letters Patent.  Patented Jan. 17, 1911.

Application filed March 24, 1910. Serial No. 551,267.

*To all whom it may concern:*

Be it known that I, RICHARD R. CYRUS, a citizen of the United States of America, residing at Covello, in the county of Columbia and State of Washington, have invented certain new and useful Improvements in Riding Attachments for Harrows, of which the following is a specification, reference being had therein to the accompanying drawing.

This invention relates to harrows and similar agricultural machines, and the principal object of the same is to provide a novel riding attachment therefor which is composed of few parts that are strongly constructed so that they will withstand the rough usage to which the attachment is subjected, and in which a convenient and comfortable seat and foot rest is provided for the operator.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a perspective view of a harrow equipped with the improved riding attachment. Fig. 2 is a vertical fragmentary sectional view showing the manner of connecting the riding attachment to the harrow: Fig. 3 is a detail fragmentary, perspective view of the coupling yoke. Fig. 4 is a similar view of the forward end of the riding attachment to which the yoke is connected. Fig. 5 is a similar view of the foot rest. Fig. 6 is an end view showing the manner of connecting the frame of the riding attachment to the spindle of the supporting wheel. Fig. 7 is a perspective view of one of the sectional boxes for connecting the frame with the wheel spindle.

Referring to said accompanying drawings wherein the invention has been shown in connection with a harrow, 1 designates the harrow which is provided with the usual draft bar 2 at its forward portion, said bar having the pendent ends 3 of the beams 4 rigidly fastened thereto. Said beams are preferably formed of angle iron and their rear ends converge and are detachably fastened to the upper surface of a flat plate 5 by the bolts 6 and nuts 7, or other convenient fastening means. Said plate 5 has a vertically arranged yoke 8 at its free end, the upper and lower arms of which are provided with the alined openings 9.

A coupler composed of a central vertical barrel 10 and oppositely disposed laterally projecting tubular extensions 11 is provided for connecting yoke 8 to the wheel frame of the riding attachment. Said barrel 10 has a bearing sleeve 12 fitted within it and said yoke and sleeve are placed between the arms of yoke 8 and by means of a bolt 13 and lock nut 14, said coupler and yoke are held in pivotal engagement. The upper end of barrel 10 is provided with a notch 15 and the upper end of sleeve 12 that projects above the notched end of barrel 10 has a bar 16 mounted thereon, said bar having a lug 17 that engages notch 15 to prevent rotation of the bar. Said bar forms a foot rest and has its ends upturned to form guards to prevent the feet of the operator slipping off the foot rest.

The outer ends of the tubular extensions 11 of barrel 10 are internally threaded for the reception of the threaded angular ends 18 of the parallel bars 19—20 which extend on opposite sides of the supporting wheel 21. Wheel 21 has a wide rim and is provided with the usual spindle whose projected ends enter the bearing formed by recess 22 in the upper surface of the lower section 23 and the complemental recess 24 formed in the bottom surface of the upper section 25, said sections forming a journal box. It will be understood, of course, that one sectional box is provided for each end of the spindle. Said boxes on their upper surfaces are provided with a transverse groove 26 for the reception of the rear ends of bars 19—20. A seat supporting spring 27 projects from each box, the upper ends of said springs projecting over wheel 21 and having a seat 27ᵃ fastened thereto. The lower ends of said springs are fastened over the grooves 26 of the boxes by the embracing clips 28, which clips retain the sections of the journal boxes together and the bars in grooves 26 as well as fastening the springs to the boxes. A spring arm 29 projects from seat 27 and has its free end equipped with a scraping blade 30 that is held in contact with the rim of wheel 21.

It will be seen from the foregoing that the improved riding attachment may be readily separated from the beams 4 by releasing bolts 6 and nuts 7, so that the harrow may be used without the riding attachment, when desired. And when connected to the harrow, the described pivotal connection between yoke 8 and barrel 10, provides for the necessary relative pivotal movements of the attachment and the harrow.

What I claim as my invention is:—

1. A device of the character described comprising a yoke adapted for attachment to a harrow, a coupler pivotally connected to said yoke, bars projecting from opposite sides of said coupler, journal boxes carried by said bars, a wheel journaled in said boxes between said bars, and a seat having a spring connection with said boxes.

2. A riding attachment for agricultural machines comprising a yoke, a coupler composed of a barrel and lateral extensions, means for pivotally connecting said barrel to said yoke, frame bars projecting from said extensions, a wheel journaled between said bars, and a seat supported above said wheel.

3. A riding attachment for agricultural machines comprising a yoke, a coupler pivotally connected thereto, frame bars projecting from said coupler, a journal box carried by each bar, a wheel journaled in said boxes, a seat spring projecting from each journal box, a seat supported over said wheel by said springs, and a foot rest carried by said coupler.

4. A riding attachment for agricultural machines comprising a coupler adapted for pivotal connection with an agricultural machine, a foot rest carried by said coupler, a wheel frame projecting from said coupler, a wheel journaled therein, and a seat supported above said wheel.

5. A riding attachment for agricultural machines comprising a coupler having a notched upper end, a foot rest fitted over said coupler and provided with a lug for engagement with the notched end of said coupler, a wheel frame carried by said coupler, a wheel journaled in said frame, and a seat supported by said frame.

6. A riding attachment for agricultural machines comprising a yoke, a coupler, means for pivotally connecting the same to said yoke, a frame bar projecting from each side of said coupler, said bars being in parallel relation, a wheel journaled between said bars, seat supporting springs projecting from said bars, and a seat carried by said springs.

7. A riding attachment for agricultural machines comprising a yoke, a coupler barrel, means for pivotally connecting the same to said yoke, oppositely disposed lateral extensions projecting from said barrel, frame bars carried by said extensions, said bars being in spaced parallel relation, a wheel journaled between said bars, and a seat supported by said bars.

8. A riding attachment for agricultural machines comprising a coupler, frame bars projecting therefrom, a journal box carried by each bar, a wheel journaled in said boxes, a seat support projecting from each box, and a seat carried by said supports.

9. A riding attachment for agricultural machines comprising frame bars, a coupler connected to one end of each bar, journaled boxes for each bar, said boxes being formed of two sections, a wheel journaled in said boxes, a seat spring projecting from each box, a clip for each box for holding the sections thereof assembled and the frame bar and the seat spring fastened thereto, and a seat carried by said springs.

10. In a device of the character described, the combination with a harrow, of the beams fastened thereto, a yoke fastened to said beams, a coupler pivotally connected to said yoke, a foot rest carried by said coupler, a wheel frame projecting from said coupler, a wheel journaled therein, and a seat supported above said wheel.

11. In a device of the character described, the combination with the harrow and its draft bar, of supporting beams connected to said bar, a yoke connected to the rear of said beams, a coupler pivotally connected to said yoke, a foot rest carried by said coupler, a wheel frame projecting from said yoke, a wheel journaled in said frame, and a seat supported above said wheel.

In testimony whereof I hereunto affix my signature in presence of two witnesses.

RICHARD R. CYRUS.

Witnesses:
R. L. Low,
L. F. Blue.